Jan. 18, 1927.
E. F. POTTER
1,614,491
SIGNALING SYSTEM
Filed July 15, 1922
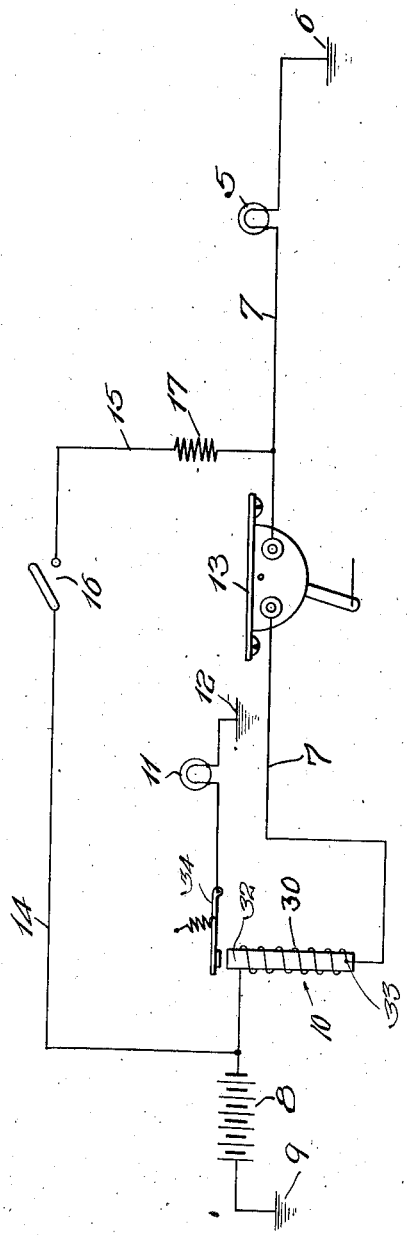

Patented Jan. 18, 1927.

1,614,491

UNITED STATES PATENT OFFICE.

EARLE F. POTTER, OF CHICAGO, ILLINOIS, ASSIGNOR TO THE POTTER SPECIALTIES COMPANY, OF CHICAGO, ILLINOIS, A CORPORATION OF ILLINOIS.

SIGNALING SYSTEM.

Application filed July 15, 1922. Serial No. 575,229.

My invention relates to signaling systems.

An object of my invention is the provision of an improved combined tail and signaling lamp for use upon automobiles, or in fact, any vehicle, and arranged so as to at all times perform the ordinary functions of a tail lamp as well as to illuminate the license number or license plate if desired, and which may in addition, be caused to display a stop warning or other signal.

Another object is to attain the above ends in a simple, improved, inexpensive and efficient manner.

A further object is the provision of means which will be reliable and give clear and effective indications.

Still further objects are to avoid material alteration of the tail lamps and accompanying circuits now employed and to provide means which may be quickly, simply and conveniently installed without the aid of a mechanic.

Further objects and advantages of the invention will become apparent as this description proceeds.

The invention is illustrated in the accompanying drawing which shows diagrammatically an illustrative circuit embodying the invention.

In the drawing 5 designates the tail lamp which may be arranged within the usual or any preferred casing and mounted in any suitable position such, for instance, as at the rear of the vehicle or otherwise as desired. The lamp 5, one end of which is grounded as shown at 6 is supplied through a conductor 7, which conductor extends to and is connected with a battery or other suitable source 8. The opposite end of the source 8 is shown as being grounded at 9.

A relay 10 of the type disclosed in my copending application, Ser. No. 468,921 filed May 12, 1921, is preferably connected electrically into the conductor 7 and to a lamp 11 to indicate through said lamp 11 the condition of the signaling circuit and apprise the driver or other occupant of the vehicle when said circuit fails to perform its proper functions. The condition indicating lamp 11 is shown as being grounded at 12.

The relay 10 is shown as comprising a winding 30 surrounding a core 32 and connected at 33 thereto. A pivoted arm 34 attracted by the core 32 upon a flow of current through the winding 30 which winding is in series circuit in the line 7, closes the circuit through the lamp 11.

The circuit from the battery 8 to the lamp 5 by way of the conductor 7 is controlled by a switch 13, which switch may be a brake pedal controlled switch, as shown, or a switch for operation by hand from a point adjacent the driver's seat. Conductors 14 and 15 provide a shunt circuit from the source 8 to the lamp 5 around the switch 13 and relay 10. This circuit is provided with the usual switch 16 by means of which switch the tail light is turned on for use as a tail light at night and extinguished in the usual manner. A resistance 17 in the shunt circuit 14—15 diminishes the voltage impressed upon the lamp 5 by way of the circuit 14—15 to dim or decrease the light given out by the lamp 5 preferably to a point where it is just sufficient for the usual tail light purposes. When the brake is applied or the switch 13 otherwise closed upon a contemplated change in movement of the vehicle, a flow is immediately set up to the lamp 5 by way of the conductor 7, short circuiting the resistance 17 and lighting the lamp 5 to its full capacity and thereby indicating a stop, diminution in speed or other change in the movement of the vehicle.

While of course the size of the incandescent lamp 5 and the amount of dimming thereof may be varied, I find that highly satisfactory results may be secured with a lamp of about 21 c. p. dimmed to about 2 c. p., for ordinary tail light purposes.

It will now be apparent that there need be no alteration of the usual tail lamp casings, etc., now in use. The only changes necessary are where the incandescent lamp in the tail lamp is not of the proper size to replace the same with one of the proper size and to insert the dimming coil or resistance 17 and properly connect the circuits 14—15 and 7.

The particular manner of dimming the combined tail and stop light and the particular circuit connections may be varied within the scope of my invention. The pilot light 11 indicates to the driver as to whether or not the lamp 5 is functioning properly as a stop signal and from such indications the driver is at the same time apprised that the lamp is performing its ordinary tail light function.

Other changes are contemplated within the scope of the appended claims.

I claim:

1. The combination with a rear light of a vehicle, of a dimming circuit for said light, said circuit having means for dimming the light to give a normally lighted tail light indication at night, means for extinguishing said tail light indication during the day, and means for completing a circuit through said light around said dimming means and around said extinguishing means to light the light at increased brilliancy irrespective of whether the dimming circuit is open or closed.

2. The combination with a rear vehicle light and a source of current, of a circuit connection between said light and said source including means for dimming the light and means for closing said circuit connection to give a normally lighted dimmed tail light indication at night and for opening said circuit connection to extinguish said tail light indication during the day, a second circuit connection between said source and said tail light, and switch means in said second circuit connection for completing a circuit from said source through said rear light around said dimming means and around the opening and closing means in said first circuit connection to light said light at increased brilliancy for the purpose of giving a stop warning during the day or night and irrespective of whether the dimming circuit is open or closed.

3. In a signaling system for vehicles, an incandescent lamp, a resistance coil, a switch for including said resistance coil in said lamp circuit to dim said lamp and give a tail light indication, and a switch for completing said lamp circuit around said resistance coil and around said first switch to display a stop warning by increasing the brilliancy of the lamp.

4. The combination with the rear light of a vehicle, of means for lighting said light at low brilliancy to give a normally lighted tail light indication at night, means for extinguishing the tail light indication during the day and means for lighting said light at increased brilliancy to give a signal warning during the day or night and irrespective of whether the light is lighted at its low tail light brilliancy or extinguished.

5. The combination with a vehicle of an incandescent light having relatively great brilliancy operable to signal a change in movement of the vehicle during the day and at night and means for decreasing the brilliancy of said light to give a normally lighted tail light indication at night.

In witness whereof, I hereunto subscribe my name this 22 day of June, 1922.

EARLE F. POTTER.